United States Patent [19]

Edwards

[11] Patent Number: 4,488,796
[45] Date of Patent: Dec. 18, 1984

[54] PHOTOGRAPHIC STILL CAMERA FILM SYSTEM

[76] Inventor: Evan A. Edwards, 2 Prospect Hill Rd., Pittsford, N.Y. 14534

[21] Appl. No.: 488,270

[22] Filed: Apr. 25, 1983

[51] Int. Cl.³ ............................................. G03B 17/26
[52] U.S. Cl. ..................................... 354/275; 354/21; 242/71.1
[58] Field of Search ...................... 242/71.1, 71.2, 197; 354/275, 21

[56] References Cited

U.S. PATENT DOCUMENTS

| | | | |
|---|---|---|---|
| 1,469,485 | 10/1923 | Rivetta | 242/71.1 |
| 1,794,426 | 3/1931 | Taylor | 242/71.1 |
| 1,897,429 | 2/1933 | Hipke | 242/71.1 |
| 2,072,625 | 3/1937 | Rose | 242/71.1 |
| 2,236,917 | 4/1941 | Pollock | 242/71.1 |
| 2,521,956 | 9/1950 | Wallace et al. | 354/275 |
| 2,541,476 | 2/1951 | Mihalyi | 242/71.1 |
| 2,662,696 | 12/1953 | Nerwin | 242/71.2 |
| 3,037,719 | 6/1962 | Bemmann | 242/71.1 |
| 3,138,084 | 6/1964 | Harvey | 354/275 |
| 3,195,720 | 7/1965 | De Canniere et al. | 242/71.1 |
| 3,282,527 | 11/1966 | D'Incerti | 242/71.1 |
| 3,384,318 | 5/1968 | Nerwin et al. | 242/71.1 |
| 3,460,449 | 8/1969 | Eagle | 354/275 |
| 3,482,681 | 12/1969 | Nerwin et al. | 242/71.2 |
| 3,614,012 | 10/1971 | Edelman | 242/71.2 |
| 3,650,489 | 3/1972 | Bresson et al. | 242/71.4 |
| 3,969,740 | 7/1976 | Hahn et al. | 242/71.2 |
| 4,024,557 | 5/1977 | Aoyama et al. | 242/71.1 |
| 4,146,321 | 3/1979 | Melillo | 354/275 |
| 4,221,479 | 9/1980 | Harvey | 242/71.1 |
| 4,290,680 | 9/1981 | Muramatsu et al. | 354/275 |

FOREIGN PATENT DOCUMENTS 1086493 11/1967 United Kingdom ............... 354/275

*Primary Examiner*—A. A. Mathews
*Attorney, Agent, or Firm*—Stonebraker, Shepard & Stephens

[57] ABSTRACT

A photographic still camera film system 10 uses a paper backed film strip 11 wound in a supply coil 20 with a leading end of the paper backing 12 attached to a take-up spindle 31 in a take-up container 30. A pair of axially interconnected end flanges 21 engage the ends of supply coil 20 with resilient material 22 carried on their inner faces. Resilient material 22 keeps the convolutions of supply coil 20 light tight. A rotatable hub supported on flanges 21 engages the inside of supply coil 20 to allow the supply coil to rotate relative to the flanges as the supply coil is unwound. The frictional engagement of resilient material 22 with the ends of supply coil 20 effectively prevents clock springing of the supply coil as it is unwound. A gear 46 arranged on take-up container 30 turns take-up spindle 31 to advance paper backed film strip 11 from supply coil 20 to take-up container 30.

20 Claims, 9 Drawing Figures

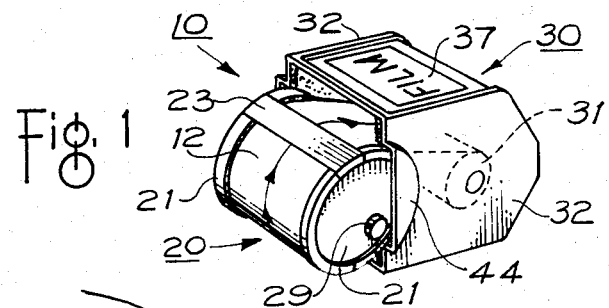
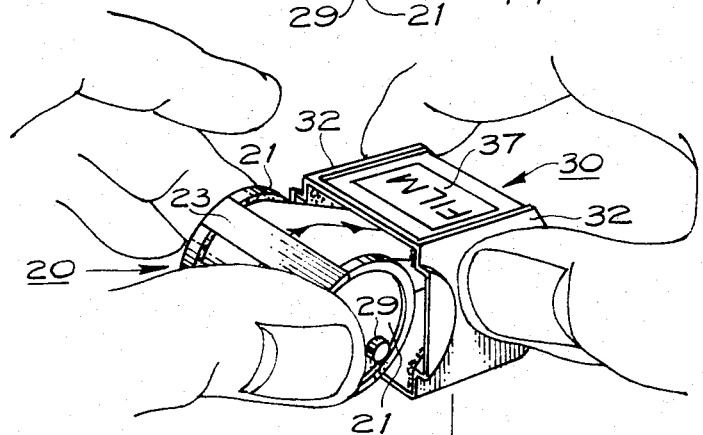
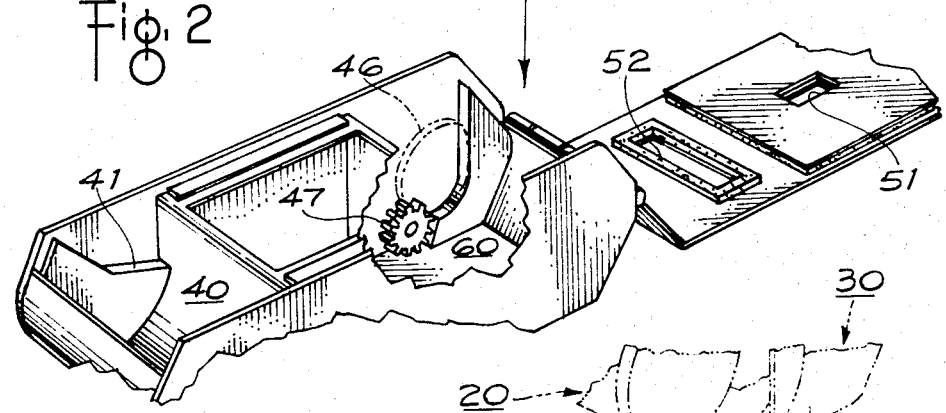
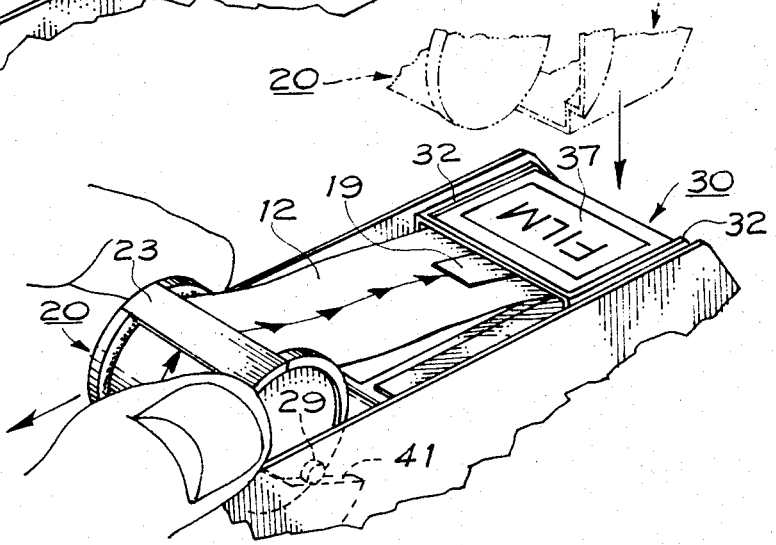

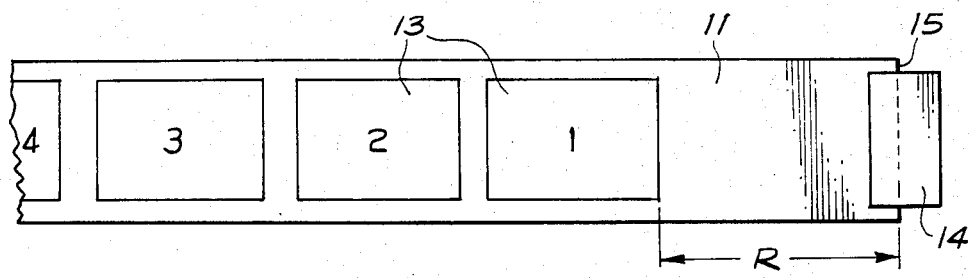
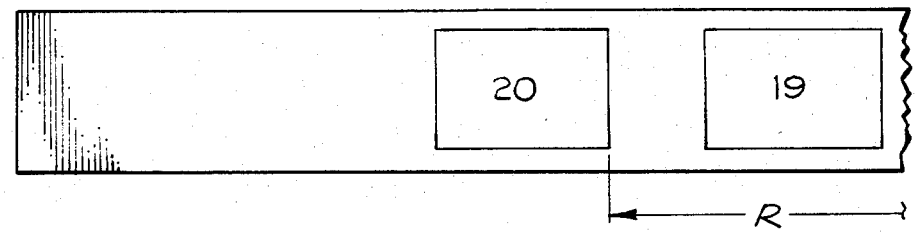
Fig. 8
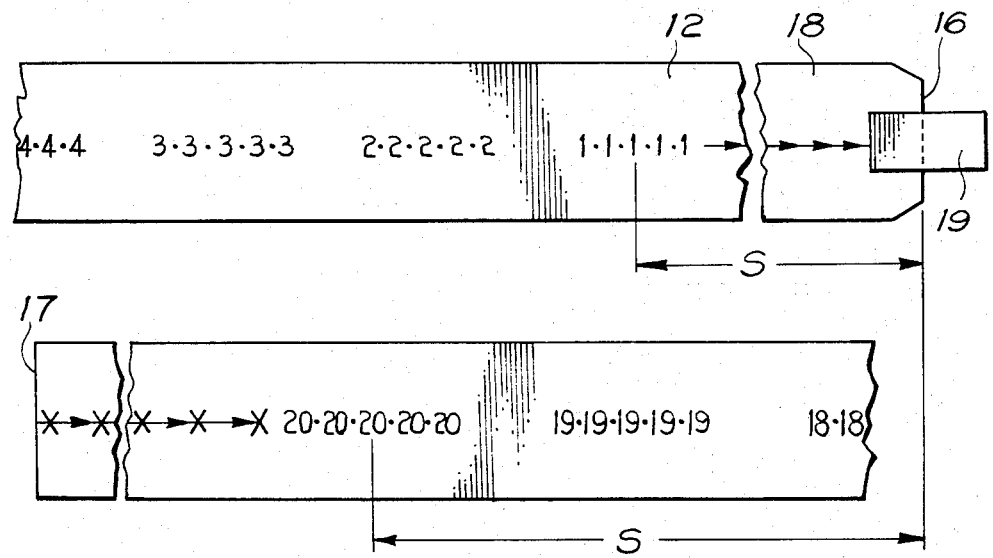
Fig. 9

PHOTOGRAPHIC STILL CAMERA FILM SYSTEM

BACKGROUND

The 35 mm photographic still camera film system that has been used for decades provides a large image area for high quality pictures, but otherwise has several serious problems. The 35 mm film strip is easily misloaded so that it does not advance in the camera. Failure to secure the leading end of the film strip so it winds on the take-up spindle is common, and it also happens that the film supply container can be canted and jammed under the camera cover to pinch the film so that the drive sprocket tears out perforations, rather than advancing the film. Since the user cannot see the film or observe its advance once the camera is closed, these errors can go undetected, and the user can operate the camera in the mistaken belief that pictures are being taken.

The 35 mm film system also requires setting a frame counter, rewinding the film after exposure, and manually entering the film speed into the camera's exposure control system. These operations, along with manual loading and threading, all present opportunities for error. Many attempts have been made to automate some of the 35 mm film system functions, but no solution to these problems has been entirely satisfactory.

I have devised a photographic still camera film system that affords the user an image area almost as large as 35 mm while eliminating manual operations and any chance for misloading the film in the camera. My film system is compatible with existing slide mounts, projectors, and film processing and print making equipment; and it also accommodates a wide variety of camera shutter and exposure control systems so that it can be used in cameras having different dimensions accommodating different operating equipment. My system greatly simplifies the loading and unloading of film, practically eliminates chances for errors, automatically apprises the camera of the type and speed of film being used, and lets the user know both the type of film in the camera and the state of its advancement. My system also allows cameras to be made smaller and lighter with fewer parts and less expense. In short, film manufacturers, camera makers, camera users, and film processors can all benefit from economies and efficiencies created by my film system.

SUMMARY OF THE INVENTION

My photographic still camera film system uses a paper backed film strip wound in a supply coil with the leading end of the paper backing attached to a take-up spindle in a take-up container. The supply coil and the take-up container are preferably removably attached when the film is initially packaged, but they are variably separable to whatever extent the camera requires as the film system is loaded. The paper backing helps protect the light tightness of the film strip so that the supply coil and take-up container need not be fully closed. The film strip has no perforations and is narrower than 35 mm film, but image areas on the film strip are preferably only slightly smaller than 35 mm image areas.

The supply coil has a pair of end flanges that are interconnected and bear resilient material engaging the ends of the supply coil to keep convolutions of the supply coil light tight. A rotatable hub supported on the flanges engages the inside of the supply coil to allow the supply coil to rotate relative to the flanges as the supply coil is unwound. The resilient material on the flanges frictionally engages the ends of the supply coil and effectively prevents clock springing of the supply coil as it is unwound. This allows both the supply coil and the take-up container coil to be kept small and compact without any backing paper shortage developing as the film advances between coils of changing radii.

A gear is arranged on the take-up container for turning the take-up spindle, and the spindle gear meshes with a camera gear that preferably turns one revolution for each film advance. The take-up spindle gear also preferably has more teeth than the camera gear so that the take-up spindle rotates a predetermined and unvarying portion of a revolution for each film advance. This varies the spacing of the images on the film strip as a take-up coil wound on the take-up spindle increases in diameter. However, the saving of film from eliminating perforated side regions more than compensates for the unused spaces between image areas toward the trailing end of the film strip.

These features of my film system lead to several important advantages. The camera becomes simpler, smaller, lighter, and less expensive by eliminating a metering sprocket, pawls, take-up clutch, rewind mechanism, frame counter, and ASA speed setting knob. Lack of these parts not only eliminates expense, but also shortens the camera longitudinally of the film strip; and lack of perforated edges on the film shortens the camera transversely of the film strip. The slightly smaller image area can shrink the camera's optical system; and all together these changes can markedly reduce size, weight, and expense relative to 35 mm systems without any substantial reduction in image area and picture quality.

Otherwise, my system accommodates all the presently preferred variations in camera exposure control systems, shutters, film advance drives, and optical systems. The variable spacing between the supply coil and the take-up container as the film is loaded into the camera accommodates dimensional variations required for different types of cameras.

My system also benefits the film manufacturer who can produce more usable film strips from the same size roll and who need not perforate the film. Use of a paper backing strip is well known and inexpensive, and my system uses the paper backing to simplify the supply coil holder and a take-up container so that the packaging cost is close to that of 35 mm.

My system benefits the user in easy and reliable loading, no rewind, error-free operation, observable film advance, and observable information on film type and speed and the frame to be exposed so that the user can know what is going on at any time. My system can automatically inform the camera of the film type and speed for automatically adjusting the camera's exposure control system, and the system can accommodate print film and transparencies. The image area of my film system is large enough to be used with conventional 2"×2" slides, and these can be used in existing projectors without any optical changes being necessary.

From the film processor's point of view, simple adaptations to existing machinery can accommodate my film system. The take-up container holding the exposed film can indicate the film type and speed automatically to the processing machinery. The edge of the film strip can be notched to indicate the location of the image areas after the developed film is scanned, and this can work in the same ways that film strips are presently notched for locating image areas for printing or cutting the developed film.

DRAWINGS

FIG. 1 is a perspective view of a preferred embodiment of my inventive film system showing a supply coil and take-up container removably attached;

FIG. 2 is a perspective view of the film system of FIG. 1 showing the supply coil and take-up container being separated for insertion into an open camera;

FIG. 3 is a perspective view of the film system of FIGS. 1 and 2 being seated into the back of an open camera;

FIG. 8 is a plan view of a film strip for the inventive system showing preferred dimensions and image areas; and FIG. 9 is a plan view of a paper backing strip for use in the inventive film system showing preferred markings and dimensions.

DETAILED DESCRIPTION

Figure 4:
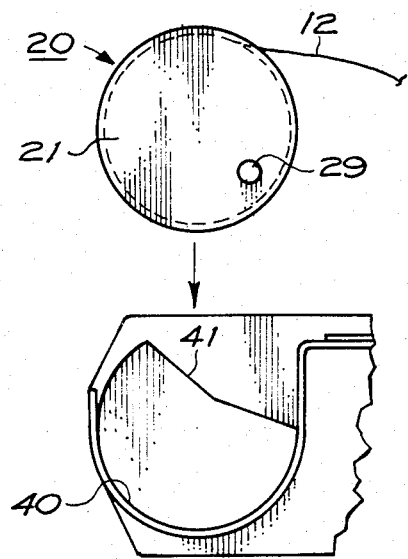
FIG. 4 is a partially schematic, side elevational view of a supply coil of the inventive system being lowered into a supply coil recess in a camera.

Film system 10 includes a supply coil 20 and a take-up container 30 and uses a film strip 11 provided with backing paper 12. Preferences for the film strip and backing paper will be described first, followed by an explanation of the preferred supply coil and take-up container and how the film system cooperates with a camera. A preferred form of camera for using my film system is shown and described in my U.S. patent application Ser. No. 488,272, filed Apr. 25, 1983 (concurrently herewith), and entitled Photographic Still Camera, the disclosure of which is hereby fully incorporated into this application.

Film strip 11 can be formed of any photographic film suitable for use in still cameras, including color, black and white, and either negative film for prints or positive transparencies for slides. Film strip 11 is preferably 24.9–25.0 mm wide, which is about the width that extends between the perforations of a 35 mm film strip. Image areas 13 are preferably 20.0–20.2 mm wide and 28.5–28.7 mm long compared with about 24×36 mm for the 35 mm format. Images areas 13 in my film system are variably spaced along film strip 11 as illustrated.

A thin and flexible attachment tape 14 secures the leading end of film strip 11 to backing paper 12 so as to minimize any bump in the take-up coil. Film strip 11 is preferably 835–845 mm long. A typical distance R in millimeters from leading end 15 of film strip 11 to the leading edge of each of twenty image areas spaced along film strip 11 is shown in the following table:

| FRAME NUMBER | DIMENSION R | FRAME NUMBER | DIMENSION R |
| --- | --- | --- | --- |
| 1 | 38 | 11 | 383 |
| 2 | 69 | 12 | 421 |
| 3 | 101 | 13 | 460 |
| 4 | 134 | 14 | 499 |
| 5 | 168 | 15 | 539 |
| 6 | 222 | 16 | 580 |
| 7 | 237 | 17 | 621 |
| 8 | 272 | 18 | 664 |
| 9 | 308 | 19 | 707 |
| 10 | 345 | 20 | 750 |

Dimensions for film strip 11 and the location of image areas 13 can vary with different thicknesses of film and backing paper and different camera distances between the working locations of supply coil 20 and take-up container 30. Any variation in the film strip dimensions preferably accommodates 20 variably spaced exposures as illustrated.

Images 13 are slightly smaller than 35 mm images, but are large enough to preserve image quality and fit within conventional 2"×2" slides for slide projectors. Side margins along film strip 11 outside of image areas 13 are large enough to accommodate notches for locating image areas and cut lines and information codes identifying film type and speed.

Backing paper 12 as shown in FIG. 9 is preferably 1235–1245 mm long from leading edge 16 to trailing edge 17 and is preferably 24.9–25.0 mm wide to match the width of film strip 11. It includes a leader region 18 adjacent leading edge 16, which is attached to the spindle of take-up container 30 by an attachment tape 19. A trailer region adjacent trailing end 17 extends beyond film strip 11.

Paper backing 12 is printed with numbers as illustrated to identify frames of the accompanying film strip, and the printed numbers are preferably visible through a window 51 in the back of the camera through which the user can observe film advance and identify the frame number positioned for exposure. The frame numbers are preferably spaced from leading edge 16 by a respective dimension S as shown in the following table:

| FRAME NUMBER | DIMENSION S | FRAME NUMBER | DIMENSION S |
| --- | --- | --- | --- |
| 1 | 38 | 11 | 383 |
| 2 | 69 | 12 | 421 |
| 3 | 101 | 13 | 460 |
| 4 | 134 | 14 | 499 |
| 5 | 168 | 15 | 539 |
| 6 | 222 | 16 | 580 |
| 7 | 237 | 17 | 621 |
| 8 | 272 | 18 | 664 |
| 9 | 308 | 19 | 707 |
| 10 | 345 | 20 | 750 |

These dimensions are for typical film and backing paper of 0.223 mm total thickness and can vary with different thicknesses of film and paper. They are also based upon a camera viewing window 51 whose center line is located 16 mm from the nearest edge of the film take-up container. Such a camera window is not necessarily located behind the camera's film gate, however. A suitable camera window 51 for viewing frame numbers on backing paper 12 is preferably 8 mm long and 4 mm wide.

Film strip 11 is secured to backing paper 12 by attachment tape 14 in a generally known way and wound into a supply coil 20 that is secured between flanges 21. Flanges 21 are preferably molded of resin material and are preferably circular with a diameter slightly larger than the diameter of the wound coil 20 of film and backing paper. The inward facing regions of flanges 21 that confront the ends of coil 20 are preferably covered with a resilient material 22 such as a plush, pile, or foamed resin material that keeps the convolutions of coil 20 light tight.

Flanges 21 are interconnected to hold coil 20 between them, and the interconnection of flanges 21 is preferably accomplished by axially extending staves 23 that are radially outside of coil 20. Flanges 21 could also be connected by a member extending axially through the open center of coil 20, but radially outer staves 23 extending between flanges 21 externally of coil 20 are preferred. With such an arrangement, wound coil 20 can be gripped by diametrically opposed grippers (not shown), and flanges 21 can be moved axially against the ends of coil 20 so that staves 23 pass between the grippers and interconnect flanges 21 in a snap fit, interlock, or other connection. Stave-end hooks 24 that are spread apart and then spring back into an interlock with a flange 21 as illustrated are one preferred possibility. Many other ways to interconnect staves 23 and flanges 21 include other mechanical interlocks and bonds formed by fusion, solvents, or adhesives.

Since backing paper 12 wound around the outside of coil 20 protects film strip 11 from light, and since resilient material 22 on flanges 21 protects the ends of the convolutions of coil 20 from light, staves 23 providing axial interconnection between flanges 21 need not and preferably do not enclose coil 20. Two staves 23 are preferred as illustrated, but other numbers of staves or interconnectors can be used.

Figure 6:
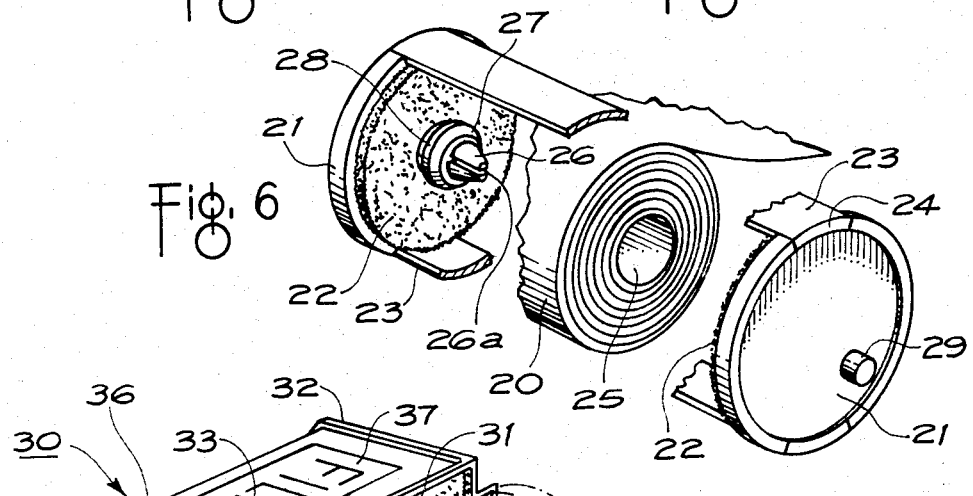
FIG. 6 is a partially cut-away, exploded perspective view of a preferred embodiment of supply coil for the inventive film system.
Figure 7:
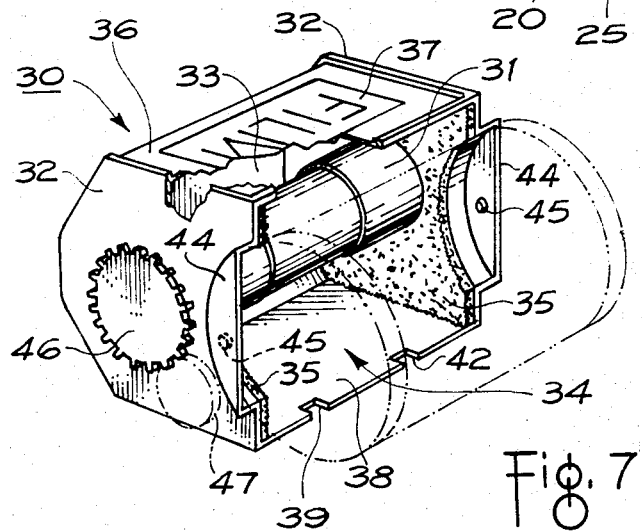
FIG. 7 is a partially cut-away, perspective view of a preferred embodiment of take-up container for the inventive film system.

Coil 20 is unwound relative to flanges 21, which generally stay in place within a camera as film is advanced. To ensure that coil 20 unwinds without jamming or mishap, a rotatable hub supported between flanges 21 engages the inside 25 of coil 20 and rotationally supports the inner convolution of coil 20. This is preferably accomplished as best shown in FIG. 6 with a pair of projections 26 that are coaxial with coil 20 and extend inward from each flange 21 and support a rotationally mounted washer 27. Washers 27 rotate freely on projections 26 which are preferably formed with slotted and resilient heads 26a so that roller washers 27 can be fitted over projections 26 and retained in place. Roller washers 27 preferably have rounded perimeters 28 allowing them to be pressed into the inside 25 of coil 20 and engage and support the inner convolution of coil 20. Resilient or pile material 22 frictionally engaging the ends of coil 20 lightly resists its unwinding to produce a moderate tension or drag as film and paper are pulled from supply coil 20.

Whenever film and backing paper move from a supply coil to a take-up coil the possibility of a backing paper shortage exists. This is well explained in U.S. Pat. No. 3,138,084. It is also considered and avoided in U.S. Pat. No. 3,614,012 by winding the take-up coil on a spindle that is always larger than the supply coil. This gives the fully wound take-up coil a diameter substantially larger than would otherwise be required.

My film system conserves valuable space within a camera by keeping both the supply coil and the take-up coil to minimum practical diameters without encountering any backing paper shortage. It does this by making supply coil 20 so that it is effectively prevented from clock springing by the resilient material 22 lining the inward facing surfaces of flanges 21.

In addition to keeping the convolutions of coil 20 light tight, resilient material 22 also frictionally engages the convolutions of coil 20 and prevents them from clock springing outward to larger diameters as coil 20 is unwound. In other words, resilient material 22 holds the inner convolutions of coil 20 to their originally wound diameters as coil 20 is unwound; and this, in cooperation with other parameters, prevents any backing paper shortage.

By thus preventing clock springing, my film system can use a reasonably small diameter take-up spindle 31 and form a more compact take-up coil within container 30 while unwinding from a compact supply coil 20 without risk of backing paper shortage. For example, supply coil 20 can have a maximum diameter of about 21 mm and can be wound on a take-up spindle having a winding diameter of about 14.1–14.3 mm to form a fully wound take-up coil with a diameter of about 25 mm. This keeps my film system reasonably compact and saves space and material in manufacture, packaging, cameras, and film processing.

Flanges 21 preferably bear outwardly extending projections or pins 29 that are aligned with each other on an axis eccentrically spaced from the axis of coil 20. Eccentric pins 29 support and orient supply coil 20 within a camera, hold flanges 21 against rotation as coil 20 is unwound, and allow flanges 21 to roll back with coil 20 to take up any excess paper extending between supply coil 20 and take-up container 30 as film system 10 is loaded into a camera. These functions are best shown in FIGS. 4 and 5.

A camera for using film system 10 has a supply coil recess 40 shaped to receive flanges 21 holding supply coil 20, and recess 40 has opposed ledges 41 at opposite ends adjacent flanges 21 for engaging eccentric pins 29. As the user lowers supply coil 20 into recess 40, pins 29 engage ledges 41 and can be lowered into recess 40 only as far as ledges 41 permit. Pins 29 are eccentric to the axis of coil 20 and are preferably disposed at about 4 or 5 o'clock as shown in FIG. 4 when supply coil 20 is detached and pulled away from take-up container 30 and lowered directly into camera recess 40. This makes pins 29 engage ledges 41 before flanges 21 and coil 20 fully enter recess 40. The engagement of pins 29 with ledges 41 as coil 20 is lowered into recess 40 forces flanges 21 and coil 20 to rotate counterclockwise as viewed in FIGS. 3–5 as coil 20 and flanges 21 move to the bottom of recess 40 and pins 29 rotate to about a 3 o'clock position.

This counterclockwise roll back takes up any excess backing paper 12 that may have been unwound when supply coil 20 and take-up container 30 are separated for loading into the camera. If no such excess paper exists, the supply coil roll back is accompanied by unwinding a suitable length of backing paper 12 from supply coil 20. The engagement of pins 29 with ledges 41 also leaves supply coil 20 free to roll farther back in a counterclockwise direction as viewed in FIGS. 4–5 to reduce any slack from further excess backing paper 12 extending to take-up container 30. In doing this, flanges 21 can rotate counterclockwise while pins 29 rotate away from ledges 41 toward a 12 or 11 o'clock position as shown by the arrow in FIG. 5.

Figure 5:
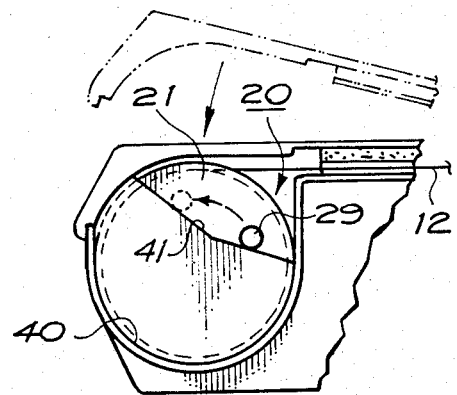
FIG. 5 is a partially schematic, side elevational view of the supply coil of the inventive system seated within a closed camera.

As supply coil 20 is unwound, its frictional engagement with resilient material 22 on the insides of flanges 21 tends to rotate flanges 21 and pins 29 clockwise as viewed in FIGS. 4 and 5. Such rotation is limited by the engagement of pins 29 with ledges 41 and the confinement of flanges 21 and coil 20 within camera recess 40. This holds flanges 21 against rotation as coil 20 is unwound from between flanges 21. This also positions axial staves 23 so as not to interfere with the advance of film from coil 20 to take-up container 30.

Container 30 supports take-up spindle 31 that is turned to advance the backing paper and film and wind a take-up coil within container 30. Container 30 is preferably molded of resin material to form opposed end walls 32 and an axial wall 33 joining end walls 32 and leaving an unclosed side region 34 facing toward supply coil 20. In the illustrated preferred embodiment, unclosed side 34 extends from top to bottom of container 30 to allow retraction of a mold core, but container 30 can also be formed in other ways to be more nearly closed along side 34. A light tight closure is not required or desirable, because backing paper 12 protects take-up coil wound in container 30 from exposure to light.

Inside surfaces of end walls 32 are preferably lined with resilient material 35 such as plush, pile, or foamed resin to ensure that convolutions of a take-up coil wound in container 30 are protected from light entering unclosed side 34. Material 35 can be the same as material 22 used on the insides of supply coil flanges 21, and material 35 also frictionally engages the ends of a take-up coil wound on spindle 31. This cooperates with the frictional drag provided by material 22 on flanges 21 to provide a slight tension or drag holding the film strip and backing paper reasonably taut between supply coil 20 and take-up container 30 so that the film is not free to shift either forward or backward in response to its natural tendency to curl.

The top 36 of container 30 preferably bears a label 37 identifying film type and speed, and label 37 is preferably visible through a window 52 in the back of the camera so that the user can see what film is being used. The bottom 38 of container 30 forms a region that can be provided with notches 39 or 42 or some other discontinuity or distinguishing means that can identify not only film speed, but negative or positive type of film. Notches or other discontinuities 39 or 42 can be sensed by a camera's exposure control system to adjust exposure for type of film as well as film speed. This saves the user not only from setting film speed manually into the camera's exposure control system, but also allows the camera system to increase the exposure for negative color film relative to positive color film. This increases the automatic versatility of the film system and camera. It also allows film processing machinery to sense the same notches or discontinuities 39 or 42 so that each film receives proper processing.

Regions of end walls 32 of take-up container 30 adjacent unclosed side 34 are preferably formed with edges 44 that are spaced apart and shaped for gripping flanges 21 of supply coil 20 in a retention fit as shown in FIG. 1. Edges 44 can also have inward facing detents 45 for snapping over and retaining edges of flanges 21 so that supply coil 20 and take-up container 30 can be snap fit together when initially loaded with film to form a package to help protect the film before loading into a camera. The user can easily pull supply coil 20 and take-up container 30 apart to a separated position as shown in FIG. 2 for loading into a camera.

Take-up spindle 31 is rotationally mounted on end walls 32 of container 30. Spindle 31 also has a coaxial gear 46 arranged to mesh with a camera gear 47 that rotates with each film advance to turn spindle 31. Spindle gear 46 preferably has more teeth than camera gear 47, which preferably rotates one revolution for each film advance, so that spindle gear 46 rotates a predetermined and unvarying portion of a revolution for each film advance. For typical film and backing paper dimensions as explained above relative to FIGS. 8 and 9 producing a supply coil 20 with an outside diameter of about 21.0 mm to be wound on a take-up spindle diameter of 14.1–14.3 mm, spindle gear 46 preferably has twenty teeth, and camera gear 47 preferably has thirteen teeth, so that take-up spindle 31 rotates 0.65 revolutions for each revolution of camera gear 47. Such rotation of the take-up spindle is effective to space 20 images 13 along film strip 11 using the previously suggested dimensions for film and backing paper.

Once my film system is loaded into a camera, seven advances of the take-up spindle is adequate for winding the paper leader and positioning film strip 11 in the camera's gate for the exposure of frame 1. After 20 exposures, seven more advances of take-up spindle 31 wind the paper trailer onto the take-up coil in container 30. No rewinding is required, and the camera can then be opened. The take-up container with its coil of exposed film is then sent to processing, and the flanges 21 and connecting staves 23 that held the supply coil are discarded.

I claim:

1. A photographic still camera film system using a paper backed film strip wound in a supply coil, a leading end of a paper backing for said film strip being attached to a take-up spindle in a take-up container that is variably separable from said supply coil, said film system comprising:
   a. a pair of end flanges for said supply coil;
   b. means for interconnecting said end flanges;
   c. resilient material covering inner faces of said end flanges and engaging ends of said supply coil;
   d. said engagement of said resilient material with said ends of said supply coil being arranged for keeping convolutions of said supply coil light tight;
   e. a rotatable hub supported on said flanges for engaging the inside of said supply coil to allow said supply coil to rotate relative to said flanges as said supply coil is unwound;
   f. said resilient material having a frictional engagement with said ends of said supply coil effectively preventing clock springing of said supply coil as said supply coil is unwound; and
   g. a gear arranged on said take-up container for turning said take-up spindle to advance said paper backed film strip from said supply coil to said take-up container.

2. The film system of claim 1 wherein each of said flanges has a projection extending coaxially of said supply coil into the inside of said supply coil, and said rotatable hub comprises a washer mounted for rotation on each of said projections and engaging said inside of said supply coil.

3. The film system of claim 1 wherein said means for interconnecting said flanges are arranged externally of said coil to extend axially between said flanges.

4. The film system of claim 1 wherein said resilient material is a pile material, and said flanges and said pile material have a diameter slightly larger than the outside diameter of said supply coil.

5. The film system of claim 1 wherein said flanges have eccentric pins extending outward from outer faces of said flanges on an axis spaced from the axis of said supply coil to support and orient said supply coil in a camera and cause said supply coil to roll back to take up any excess initial length of said paper backing extending between said supply coil and said take-up container as said film system is loaded into said camera.

6. The film system of claim 1 wherein said take-up spindle gear is arranged for meshing with a camera gear that turns said take-up spindle gear a predetermined and unvarying portion of a revolution for each film advance.

7. The film system of claim 6 wherein said take-up spindle gear has a predetermined number of teeth in excess of a number of teeth on said camera gear so that one revolution of said camera gear for each film advance turns said take-up spindle gear said predetermined portion of a revolution.

8. The film system of claim 7 wherein said take-up spindle gear has 20 teeth and said camera gear has 13 teeth.

9. The film system of claim 1 wherein said film strip is about 25 mm wide and image areas on said film strip are about 20 mm by 28.5 mm and are variably spaced along the length of said film strip.

10. The film system of claim 1 wherein said take-up container has end walls bearing resilient material arranged for frictional and light tight engagement with ends of a take-up coil of said film strip wound on said take-up spindle.

11. The film system of claim 1 wherein said take-up container has end walls supporting said take-up spindle and an axial wall joined to said end walls and formed to leave an unclosed side region of said take-up container facing toward said supply coil.

12. The film system of claim 11 wherein said end walls bear resilient material arranged for frictional and light tight engagement with ends of a take-up coil of said film strip wound on said take-up spindle.

13. The film system of claim 1 wherein said take-up container has end walls formed to engage said supply coil end flanges in a retention fit for removably interconnecting said supply coil and said take-up container to form an initial film package prior to camera use.

14. The film system of claim 1 wherein said take-up container has a surface region formed to distinguish between negative and positive type film in said supply coil so that an exposure control system in a camera can sense said surface region for automatically adjusting exposure for negative and positive type film.

15. The film system of claim 1 wherein each of said flanges has a projection extending coaxially of said supply coil into the inside of said supply coil, said rotatable hub comprises a washer mounted for rotation on each of said projections and engaging said inside of said supply coil, and said take-up container has end walls bearing resilient material arranged for frictional and light tight engagement with ends of a take-up coil of said film strip wound on said take-up spindle.

16. The film system of claim 15 wherein said means for interconnecting said flanges are arranged externally of said coil to extend axially between said flanges, and said take-up container has end walls supporting said take-up spindle and an axial wall joined to said end walls and formed to leave an unclosed side region of said take-up container facing toward said supply coil.

17. The film system of claim 15 wherein said flanges have eccentric pins extending outward from outer faces of said flanges on an axis spaced from the axis of said supply coil to support and orient said supply coil in a camera and cause said supply coil to roll back to take up any excess initial length of said paper backing extending between said supply coil and said take-up container as said film system is loaded into said camera.

18. The film system of claim 17 wherein said means for interconnecting said flanges are arranged externally of said coil to extend axially between said flanges, said resilient material is a pile material, and said flanges and said pile material have a diameter slightly larger than the outside diameter of said supply coil.

19. The film system of claim 15 wherein said take-up spindle gear is arranged for meshing with a camera gear that turns said take-up spindle gear a predetermined and unvarying portion of a revolution for each film advance, and said take-up container has end walls supporting said take-up spindle and an axial wall joined to said end walls and formed to leave an unclosed side region of said take-up container facing toward said supply coil.

20. The film system of claim 19 wherein said take-up spindle gear has a predetermined number of teeth in excess of a number of teeth on said camera gear so that one revolution of said camera gear for each film advance turns said take-up spindle gear said predetermined portion of a revolution, and said end walls bear resilient material arranged for frictional and light tight engagement with ends of a take-up coil of said film strip wound on said take-up spindle.

* * * * *